May 3, 1966 P. J. NATHO 3,248,879
CONSTANT PRESSURE SOURCE FOR VALVES
Filed April 22, 1965 2 Sheets-Sheet 1

INVENTOR.
PAUL J. NATHO
BY
*James L. Jackson*
AGENT

May 3, 1966 P. J. NATHO 3,248,879
CONSTANT PRESSURE SOURCE FOR VALVES
Filed April 22, 1965 2 Sheets-Sheet 2

INVENTOR.
PAUL J. NATHO
BY
*James Jackson*
AGENT

United States Patent Office 3,248,879
Patented May 3, 1966

3,248,879
CONSTANT PRESSURE SOURCE FOR VALVES
Paul J. Natho, Houston, Tex., assignor to ACF Industries Incorporated, New York, N.Y., a corporation of New Jersey
Filed Apr. 22, 1965, Ser. No. 450,097
13 Claims. (Cl. 60—36)

This application is a continuation-in-part of my copending application, Serial No. 140,605, filed September 25, 1961, now abandoned, entitled, Constant Pressure Source for Valves.

This invention relates to the provision of a constant source of pressure for valves and other apparatus and to a method of controlling hydraulic operators.

The present invention is directed to the problem of providing a constant source of pressure to insure the automatic fail-safe operation of valves, particularly oilfield valves used in wellhead assemblies. The trend in the petroleum industry, as elsewhere, is toward automation. In particular, it is becoming increasingly common to provide valves with means by which they can be automatically operated from a point distant from the valve itself. Such means many times is a hydraulically or pneumatically operated cylinder having a movable piston which is attached to the valve operating stem. Due to the pressures involved and the seriousness of the consequences of failure, many oilfield production operators insist upon some type of fail-safe construction. As a rule, this means that upon failure of hydraulic pressure the valve will automatically move, by energy supplied independent of the hydraulic force, to a closed position; however, for some special installations it could indicate movement of the valve to an open position. Accordingly, while the valve may be operated from a remote location by utilization of hydraulic pressure, it is necessary to provide some additional means which will insure that the valve will automatically return to a predetermined position should the hydraulic pressure fail. One common means of providing such fail-safe feature has been to provide a heavy spring on one side of the piston so that if the hydraulic pressure, normally operating the valve, is exhausted the valve will automatically move to the predetermined position by the action of the spring. While springs are satisfactory in many such installations, the magnitude of springs for such operation is tremendous and through usage the spring loses its force. Furthermore, springs by their inherent characteristics provide a variable force proportional to the extent of their compression or extension. This characteristic is sometimes objectionable because the force provided is insufficient for one position of the piston yet too great for the alternate position of the piston. Moreover, many such installations use a single line to deliver and exhaust the hydraulic fluid used to apply the necessary pressure and there is a considerable amount of line friction to be overcome to exhaust the pressure. It is difficult to install a spring of sufficient magnitude to move the valve to the fail-safe position in a short period of time.

Of late, much exploration has been done in the offshore areas and work has been started on the underwater completion of such wells. In such case, the wellhead valves will be located beneath the surface of the water and access to the installation will be difficult. Also, in such installation the hydraulic line to the valve will usually be of considerable length whereby line friction becomes an important factor. Therefore, it is of primary importance to have a constant pressure source which can be depended upon for a long period of time. It is an object of the present invention to provide a constant source of pressure of sufficient energy to quickly move a valve to the fail-safe position. It is also of prime importance to provide a structure which is capable of rendering the valve or other underwater device fail-safe and which is capable of being submerged without creating problems of excessive buoyancy. The structure must be of limited size and of considerable density to assure that it will not be excessively buoyant in sea water or in any other liquid in which it is to be submerged.

Another problem in the completion of underseas wells is that although the operating mechanism is usually encased in a hermetically sealed container it is difficult to prevent the entry of some sea water which is very corrosive. It is a further object of the present invention to provide a means to prevent water accumulation in submerged encased mechanisms.

Various compressible fluids have a substantial pressure in their vapor stage and the change from a liquid to a vapor occurs at a temperature which is close to ambient temperature. For example, ethane has a vapor pressure of approximately 485 p.s.i.g. at 60° F. and has a volume in the vapor stage at 485 p.s.i.g. of over 8.6 times its liquid volume. Theoretically, the same pressure will exist in the system until the last drop of liquid has been converted into vapor. Therefore, there would be a constant source of around 485# of pressure available as long as any liquid remained. If a system requires 485 p.s.i. pressure to assure movement of the valve to the predetermined position, it would be necessary to use a fluid having a vapor pressure in this neighborhood at ambient temperature. As just mentioned, ethane would meet such conditions. The liquid ethane could be easily stored in a minimum amount of space. Initially one side of the piston operator with the piston at its further point into the cylinder would be charged with liquid ethane. The other side of the piston would be subjected to hydraulic pressure which could be controllably exerted and withdrawn. When the hydraulic pressure is withdrawn or inadvertently exhausted, the pressure opposing the ethane would decrease and the ethane would vaporize and move the valve to the predetermined position. Upon restoration, the gas generated by the vaporization of the ethane would again be compressed into a liquid stage and remain stored. In other words, the ethane gas could be impinged upon one surface of the piston; and in the event that there is a decrease in pressure on the opening side of the piston, the ethane would provide the energy necessary to positively move the piston in the opposite direction. This system would be closed or self-contained in every respect and upon operation of the valve the ethane would be automatically changed from liquid to gas and vice versa; but if the pressure on the other side of the piston decreases, the vaporizing of the ethane would provide the necessary force to cause the valve to move in the opposite direction which will be a predetermined position for the valve.

If the use of ethane gas is objectionable because of its explosive nature, the various fluorinated hydrocarbons such as those sold under the trademark "Freon" could be used. In a high pressure system requiring a pressure in the neighborhood of 1,000 p.s.i., carbon dioxide which has a vapor pressure of 1,073 p.s.i. at 88° F. could be used.

The basic premise is to select a liquid which has a vapor pressure in the range necessary for the required operation and to incorporate it in a closed system on the other side of a piston of a hydraulically operated remotely controlled valve. The hydraulic pressure system would overcome the pressure of the vaporized gas and convert the gas back into a liquid stage; however, if the hydraulic pressure was either taken off purposely or accidentally disturbed, the fluid on the other side of the piston would automatically change into its vapor stage and move the piston in the opposite direction. The utilization of such a constant source of pressure is particularly advantageous for underwater application where the temperature remains fairly constant throughout the year.

Obtaining an operating pressure source—for instance 500 p.s.i.—from a stored gas such as nitrogen through a pressure regulator incorporates several disadvantages in that the malfunction of the regulator immediately affects the operating pressure. Also the compression and expansion of the gas by volumetric change due to piston movement increases and decreases its effective pressure resulting in an undesirable variable force similar to that provided by a spring as previously stated.

The cylinders for the operating mechanism are usually encased and a portion of the gas could be vented around to the seal of the container and pressure of the fluid being higher than the water pressure on the outside would act as a positive means of preventing the entrance of any sea water into the container and thereby prevent its corrosion. This could be a part of the fail-safe feature or could be a separate container of liquid for this purpose. If the entire wellhead assembly is encased, a container of fluid could be again used to provide this protection from the corrosive action of sea water. It can be used as a positive pressure or it can be used to balance against the pressure of the water.

In the drawings, in which preferred embodiments of the invention are illustrated:

Figure 1:
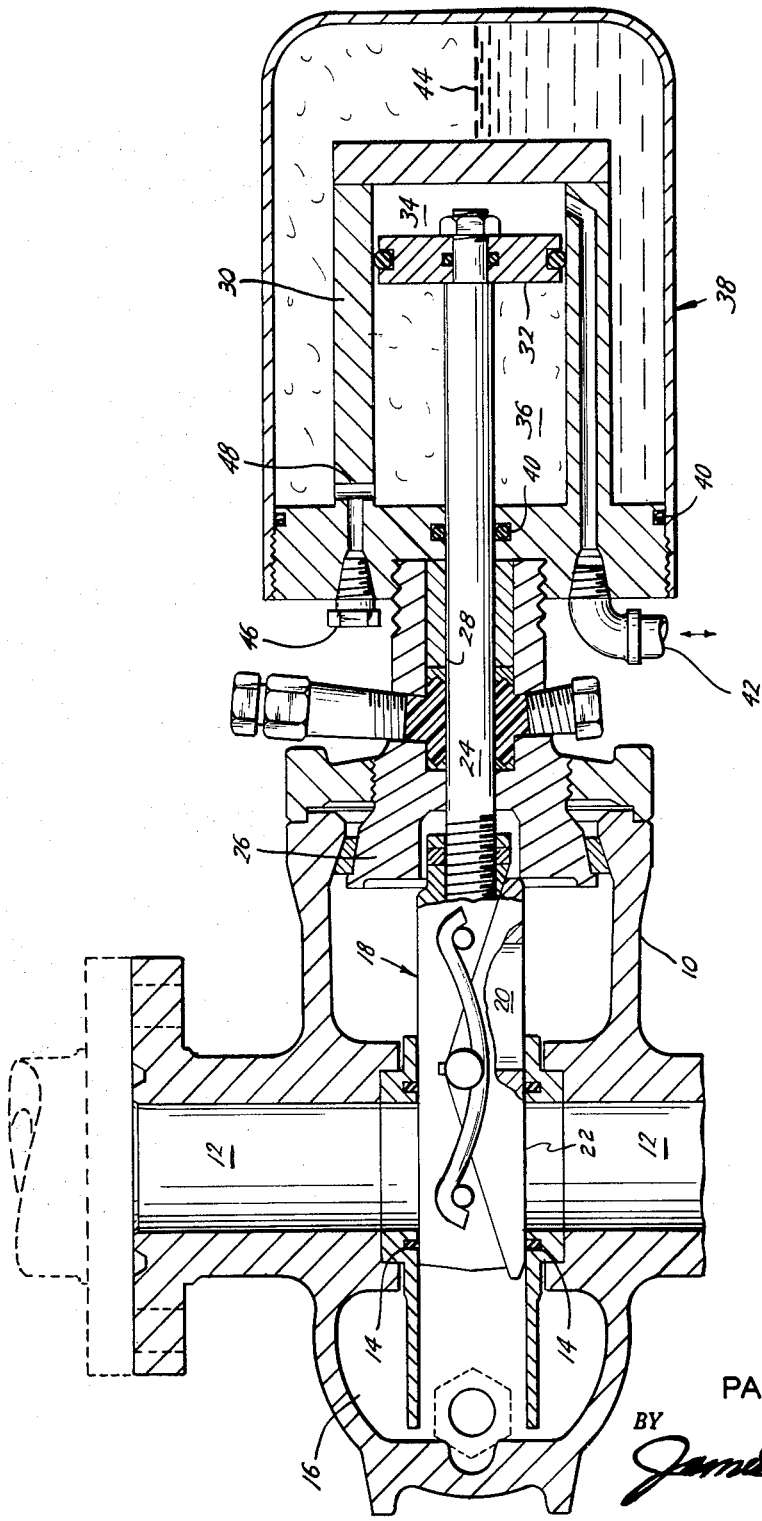
FIGURE 1 is an elevational view in section of a gate value having connected thereto a fail-safe operator constructed in accordance with the present invention. The valve is shown in the closed or fail-safe position.

Referring now to the drawing in FIGURE 1, there is shown a gate valve of customary construction. The valve is shown positioned with the axis through its conduit perpendicular which is the normal position of master valves in Christmas tree assemblies. The type shown is generally referred to as a parallel double expanding through conduit gate valve generally in conformance with Laurent United States Patent Re. 20,101. Naturally, any other type of valve capable of operation by a hydraulic cylinder could be used, and the operating mechanism is capable of operating devices other than valves without departing from the spirit and scope of the invention. For the purpose of illustration, the operating mechanism is shown and described in conjunction with an expanding gate valve. The valve has a valve housing 10 which is provided with inlet and outlet ports 12, the axial inner end of which is provided with seats 14. Interposed between the inlet and outlet ports is an open-ended valve chamber 16 in which is located a reciprocating valve member 18. The valve member shown has a passage 20 which in the open position aligns with the inlet and outlet ports 12 forming the bore of the valve to permit flow through the valve and a solid portion 22 which in the closed position cooperates with the sealing surface of the seats 14 to prohibit flow communication between the inlet and outlet ports 12. In the valve shown, which will fail-safe close, the passage 20 is located at the axial upper end of the valve member 18. If a fail-safe open valve is desired, the passage would be located in its axial lower section. The valve member shown is of two-piece construction and expands parallel to the axis of the bore of the valve to mechanically seal with the seats 14. A stem 24 is connected to the valve member 18 and controls the movement of the valve member 18. The valve chamber 16 is closed by a bonnet 26 having a sealed passage 28 through which the stem 18 extends. The bonnet, in effect, becomes part of the valve housing.

Attached to the bonnet 26 is a hydraulic cylinder 30.

A piston 32 in the cylinder 30 divides the cylinder into two compartments, namely 34 and 36. The piston 32 is connectively attached to the stem 24 which controls the movement of the valve member 18. In instances where the valve is used for a wellhead installation in the underseas completion of a well, the cylinder 30 will usually be enclosed by a container 38. In some instances, a secondary container, not shown, may cover the entire valve or wellhead assembly. The container 38 is provided with hermetical seals 40 to prevent the entrance of corrosive sea water to the cylinder 30. Connected to the compartment 34 is a hydraulic connection 42 which permits the application of hydraulic pressure to the side of the piston 32 which is in compartment 34. It is quite customary to provide hydraulic pressure to only one side of the piston and to use some other force—usually a spring—to return the piston 32, likewise the valve member 18 to the other position in the event of hydraulic pressure reduction either selectively by control of the hydraulic fluid at its source or inadvertently, by rupture of the hydraulic line, etc. Such construction assures movement of the valve to a predetermined position exclusive of the hydraulic operation. This feature is of importance in isolated locations. Usually in wellhead installations, the predetermined or fail-safe position is the closed position. There usually is only one hydraulic line to the pressure side of the cylinder and while it is relatively easy to develop ample pressure to operate the valve, it is extremely difficult due to line friction and hydrostatic head of the hydraulic fluid resulting from the submergence of the valve to develop sufficient force to return the valve to the fail-safe position. Mechanical springs which are commonly used for this purpose are not entirely satisfactory. As stated in the introduction, it is to the provision of a constant source of pressure that is capable of producing uninterrupted sufficient energy to return the valve to the fail-safe position that the present invention is directed.

In accordance with the basic concept of the invention, the source of constant energy is a compressible fluid 44 which fills a portion of the container 38 and compartment 36. The compressible fluid will condense from a vapor to a liquid phase at specific predetermined pressures and temperatures. As the energy of the fluid begins to dissipate through operation, an amount of the fluid 44 will evaporate, thus maintaining the pressure at a substantially constant value. The compressible fluid can be introduced through a fitting 46. A port 48 in the cylinder 30 provides for communication between compartment 36 and the container 38. Having the compartment 36 and container 38 in direct communication provides ample storage volume for the fluid 44 and permits the fluid to be used both as a source of constant energy to move the valve to the fail-safe position and also by being at a higher pressure than the surrounding atmosphere keeps sea water out of the container. If desired, only the compartment 36 may be charged with compressible fluid 44. The compressible fluid 44 has a vapor pressure capable at ambient environmental temperatures of supplying sufficient energy to cause the piston 32 to move to the hydraulically operated side of compartment 34 upon dispensation of hydraulic pressure. Moreover, the vapor or the liquid phase of the fluid will fill the entire container and being at a higher pressure than the sea water will be further assurance against any leakage of sea water into the container 38 thence into the cylinder 30 itself.

Since change in volume of the liquid 44 within the container 38 will not affect the pressure, the compressible fluid 44 provides a source of constant pressure which in the event the hydraulic pressure in compartment 34 is exhausted either purposefully or accidently will provide sufficient energy to cause the piston 32 to move to the hydraulic pressure side of the cylinder thereby moving the valve to the predetermined position. Let us assume for example that the force necessary to move the piston and valve member to the predetermined position is 450 p.s.i. In such event a compressible fluid having a pressure in the vapor stage approximating 450 p.s.i. can be used. The compartment 36 will be filled with such fluid. One method is to fill the compartment with the piston 32 at its point of greatest entry thereinto with the liquid stage. Accordingly, there will be available, opposing the piston, at all times a pressure source of 450 p.s.i. As the pressure on the other side of the piston is exhausted, the fluid will change from a liquid to a vapor and move the piston toward the hydraulic side. Upon restoration of hydraulic pressure, movement of the piston back into the compartment containing the compressible fluid will change some of the vapor back into liquid. The system containing the compressible fluid is closed and the compressibility of the fluid from a vapor into a liquid and change back to vapor takes care of any change in the volume of the area resulting from the movement of the piston. The same pressure will remain available as long as one drop of liquid remains.

One fluid that can be used for this purpose is ethane, which has a vapor pressure of approximately 485 p.s.i.g. at 60° F. and has a volume in the vapor stage at 485 p.s.i.g. of over 8.6 times as great as in the liquid stage. With such fluid, a constant source is always available to move the valve to a predetermined position should the hydraulic pressure moving the valve to the other position be withdrawn. If a non-explosive type fluid is required, one of the fluorinated hydrocarbons sold under the trademark "Freon" could be used. Various of the Freons have a vapor pressure in the normal usable range to provide a valve with the constant source of pressure needed for fail-safe operation. If a higher pressure is needed for fail-safe operation, carbon dioxide which has a vapor pressure of 1073 p.s.i. at 88° F. could be utilized.

Figure 2:
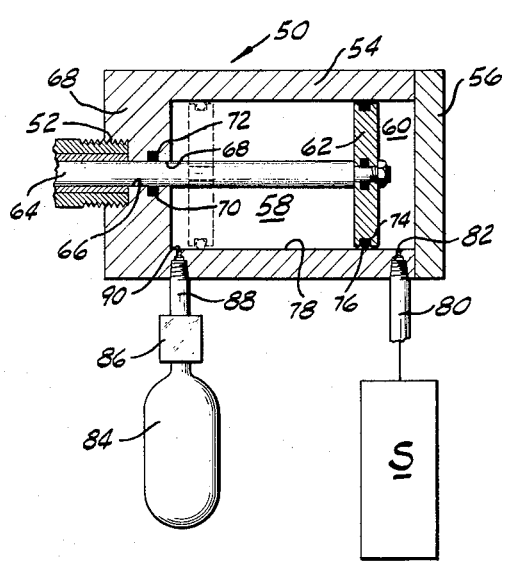
FIGURE 2 is a sectional view of a modified embodiment of the invention.

With reference now to FIGURE 2 of the drawings, a piston operator 50 has its base portion 68 provided with internal threads 52 or the like for connecting the operator 50 to the stem operated device for which operation is desired. The piston operator 50 is provided with a cylindrical wall 54, having a closure plate 56 affixed in sealing relation thereto, to define an enclosed cylindrical chamber. The cylindrical chamber is divided into two compartments 58 and 60 by a movable piston 62. An operating stem member 64 extends through an aperture 66 formed in the base wall 68 of the operator 50, and is fixed at one extremity thereof in any desired manner to the piston 62. A sealing member 70 is disposed within an annular groove 72 formed about the aperture 66 and establishes a fluidtight hermetic seal between the stem member 64 and the bore wall 68 of the operator 50. An annular groove 74, formed in the cylindrical exterior periphery of the piston 62, is provided with a sealing member 76, which may be in the form of a resilient O-ring or the like, for the establishment of a fluidtight seal between the piston 62 and the interior cylindrical wall 78 of the operator 50.

Fluid pressure from a hydraulic supply source S is communicated into the compartment 60 through a hydraulic fluid supply conduit 80, connected into the cylindrical wall 54 of the operator 50, adjacent one extremity thereof. A port 82 formed in the cylindrical wall 54 provides fluid communication between the conduit 80 and the compartment 60. Hydraulic fluid from the hydraulic supply source S under pressure is controllably forced into the compartment 60 to move the piston 62 and the stem 64 to the operative position of the device to be controlled, as illustrated in dash lines in FIGURE 2.

Figure 3:
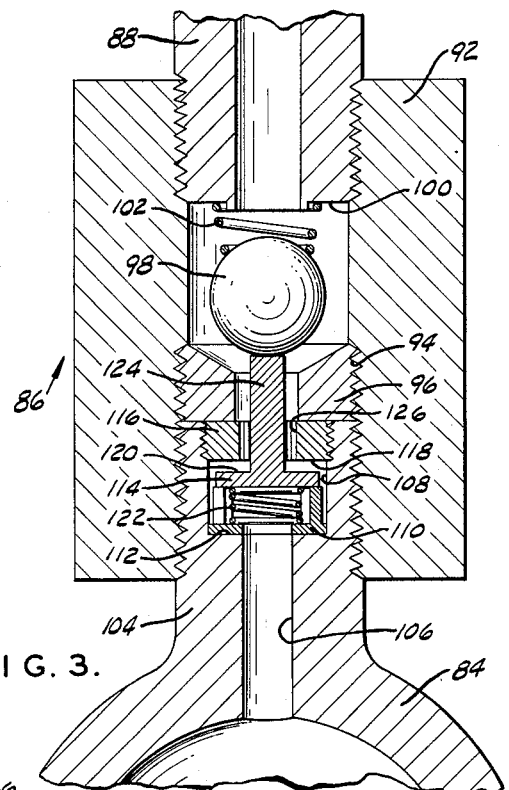
FIGURE 3 is a fragmentary sectional view of the connection structure of FIGURE 2.

For controlling movement of the piston 62 in the direction toward the end wall 56, a container 84, having a liquid therein capable of supplying desirable vapor pressure, as discussed hereinabove, is in fluid communication with the compartment 58 of the operator 50 through a check valve assembly 86. A conduit 88 is received within a threaded bore 90, formed in the cylindrical wall 54 of the operator 50, and is connected at one extremity thereof to the check valve assembly 86. The specific check valve assembly illustrated in FIGURE 3 is intended only for purpose of illustration rather than limiting in regard to the invention. Other suitable check valve assemblies might be employed with equal success without departing from the spirit and scope of the invention.

As illustrated in greater detail in FIGURE 3, the check valve assembly 86 comprises a valve housing 92 connected to the conduit 88 and having a threaded bore 94 formed therein. A check valve seat 96 is threadedly received within the bore 94 and provides a valve seat for a generally spherical check valve member 98. An internal support surface 100 is formed at the extremity of the conduit 88 and when in assembly with the housing 86 serves as a support for a spring 102 biasing the check valve 98 toward the seat 96.

The fluid container 84 has a threaded neck portion 104, which is received within the threaded bore 94, in sealing relation therewith. The neck 104 of the container 84 is provided with a passage 106 for conducting fluid from the container to the check valve assembly 86. An enlarged bore 108 is formed at the outer extremity of the passage 106 for retaining a container check valve assembly for controlling flow of the fluid through the passage 106. A check valve stop 110 is disposed within the bore 108 and is seated on a shoulder 112 formed at the intersection of the passage 106 and the bore 108, and serves as a stop for a disclike check valve 114. A check valve seat 116 is threadedly received at the outer extremity of the bore 108 in sealing relation therewith, and provides a sealing surface 118 against which a sealing surface 120 on the check valve 114 may establish intimate sealing engagement to prevent the flow of fluid from the container 84. A spring member 122 of considerably lower compressive value than the spring 102 is interposed between the shoulder 112 and the check valve 114 and normally serves to bias the check valve 114 into sealing engagement with the seat 116. The disclike check valve 114 is provided with an operating stem 124, which extends through a fluted aperture 126 in the seat 116 and is adapted for engagement with the spherical check valve 98.

In the unassembled condition of the container 84 to the check valve assembly 86, the spherical check valve 98 will be biased to its closed position by the spring 102 and the disclike check valve 114 of the container 84 will be biased by the spring 122 into sealing engagement with the sealing surface 118 of the seat 116. As the container 84 is threaded into the threaded bore 94, the stem portion 124 of the check valve 114 will come into contact with the spherical check valve 98 and because the spring 102 is of higher compressive value than the container spring 122 will cause unseating of the check valve 114, thereby establishing communication between the container 84 and the check valve assembly 86. As threading of the threaded neck 104 into the threaded bore 94 continues, the spherical check valve 98 will become unseated and will cause further unseating of the check valve 114. Further movement of the neck 104 into the housing 92 will cause the container check valve 114 to become supported by the stop member 110 against further displacement. Continued movement after the check valve 114 has become supported will cause the check valve 98 to become further unseated, thereby establishing substantial cross-sectional area of fluid communication between the container 84 and the compartment 58 through the check valve assembly. As illustrated in FIGURE 3, the check valve stop 110 is provided with a series of cutaway portions which define small stop surfaces and produce fluid flow passages around the check valve 114 in the seated position thereof. The fluted aperture 126, in addition to providing guide surfaces for the stem 124, also provides flow passages between the stem and the valve seat 116. In removing the container 84 from the check valve assembly 86, the operator merely unthreads the threaded neck 104 from the passage 94. In doing so, the springs 122 and 102 respectively force the check valve 114 and 98 into their respective seated positions, thereby preventing further flow of fluid either from the container 86 or from the compartment 58. This construction effectively allows the container to be replaced without involving a loss of pressure within the compartment 58.

Figure 4:
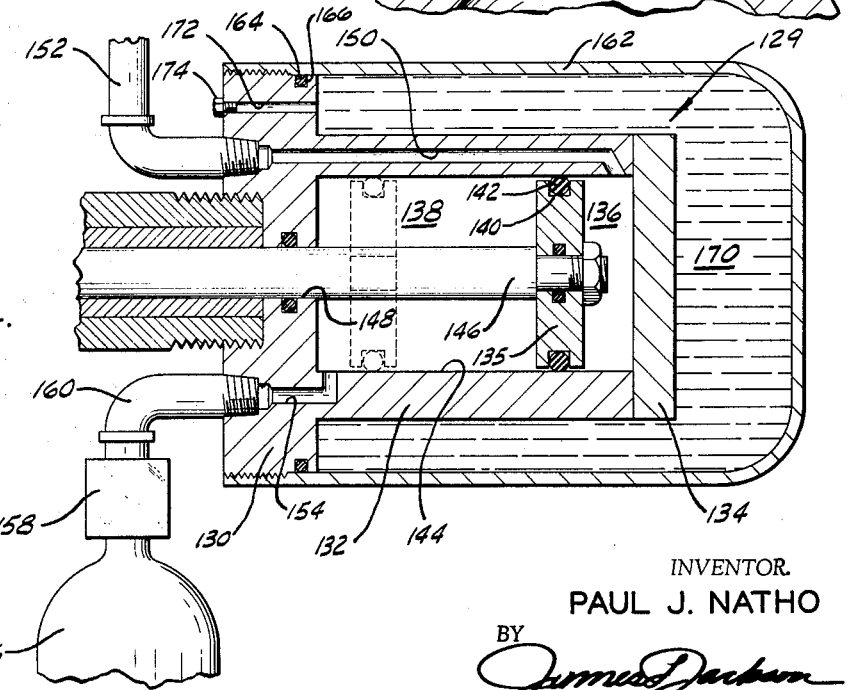
FIGURE 4 is a cross-sectional view of a further embodiment of the invention.

As illustrated in FIGURE 4, a modified form of the invention is provided especially for underwater use and comprises a piston operator 129 having a base portion 130, on which is formed a cylindrical wall 132. A closure 134 is affixed in any desired manner to one extremity of the cylinder wall 132 and cooperates with the cylindrical wall and base portion 130 to define a closed cylindrical chamber. A piston 135 is disposed within the chamber and divides the chamber into compartments 136 and 138. A peripheral groove 140 is formed about the exterior periphery of the piston 135 and receives a sealing member 142 for the establishment of a fluid-tight seal between the piston 135 and the internal cylindrical wall 144 of the chamber. An operating stem 146 extends in sealing relation through an aperture 148 formed in the base portion 130 and is connected to the piston 135 in any desired manner. A bore 150 is formed through the base portion 130 and through the cylindrical wall 132 and opens into the chamber 136. A hydraulic connection 152, connected to the base portion 130 and in communication with the bore 150, is adapted for controllably supplying hydraulic fluid under pressure to the compartment 136 for imparting movement of the piston 135 and the stem 146 from the FIGURE 4 position to an operative position illustrated by dash lines in FIGURE 4.

A passage 154 is formed through the base portion 130 through a portion of the cylindrical wall 132, and opens into the compartment 138. A container 156 of fluid having a considerably high vapor pressure, is communicated through a check valve assembly 158 and through a conduit connection 160, into the partially threaded passage 154. The construction of the container 156 and the check valve 158 are similar to the container and check valve constructions illustrated in FIGURE 3 and serve a similar purpose.

A housing or enclosure 162 is threadedly attached to the exterior periphery of the operator base 130 to form a protective cover for the operator assembly. A sealing member 164, which may be of the O-ring type, is disposed within a groove 166, formed in the exterior periphery of the base portion 130 and provides a hermetic seal between the housing 162 and the base portion 130. The housing 162 is substantially larger in diameter and length than the cylinder 132, thereby defining a chamber or space about the entire peripheral portion of the cylinder 132. The chamber 170 is filled with a preservative liquid, such as a suitable oil, which is substantially incompressible and which is adapted to prevent crushing of the protective housing 162 by the hydrostatic pressure of the fluid in which the operator assembly is submerged. The preservative fluid may be installed within the chamber 170 prior to assembly of the protective housing 162 to the base portion 130 of the operator, or the operator may be provided with a threaded filling passage 172, which is closed by plug member 174 after completion of the filling operation. Means may also be provided for the maintenance of balanced internal and external pressures with respect to the protective housing 162. A pressure balancing system may be employed to maintain the preservative fluid within the chamber 170 at the same pressure as will exist exteriorly of the protective covering 162.

The invention is advantageous, particularly because the power source, i.e., the container 84 of vaporizing fluid, is small, compact and quite dense, so that the buoyancy of the same is relatively immaterial. In contrast to the smallness and compactness of the container 84, because of the nature of the vaporizing liquid contained therein, the small amount of liquid will provide sufficient power for many many operation cycles of the fail-safe mechanism. Therefore, even though leakage may develop during the operation of the fail-safe operator, any loss of pressure within the chamber 58 will immediately be replaced by evaporation of fluid within the container 84 and the pressure within the compartment 58 will remain substantially constant. The pressure within the chamber 58 will remain substantially constant, regardless of the position of the piston, thereby assuring positive control of the piston 62 during the fail-safe movement, as described above in regard to FIGURE 1.

Wellhead equipment other than valves used in conjunction with remote or underwater completions often requires the movement of latches, slips, locking dogs and the like which can be effectively accomplished by a piston under hydraulic pressure. To return the latches, etc., connected to the piston to the preferred position, liquids with sufficient vapor pressure as cited above can be conveniently used. This is especially desirable where the geometry of the mechanism or space limitations will not permit the use of a spring.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

I claim:

1. The method of controlling longitudinal movement of an operating stem having a piston fixed at one end thereof and which piston is confined within a cylinder and divides the cylinder into first and second compartments, said method comprising the steps of actuating the operating stem in one direction by a source of fluid pressure communicated into said first compartment, returning the operating stem to its initial position upon reduction of the pressure from the source of fluid pressure by providing a second source of fluid pressure in the second compartment normally available to the piston which second source of fluid pressure is in the form of a vaporizing fluid of a nature to maintain a constant pressure of a predetermined minimum, condensing the vapor by moving the operating stem to its initial position by the first source of fluid pressure.

2. The method of controlling longitudinal movement of submerged apparatus which is controlled by an operating stem having a member connected thereto comprising the steps of actuating the member confined in a compartment by a source of power such as fluid pressure, returning the member operated by fluid pressure to its initial position upon failure of the fluid pressure by providing a second source of fluid pressure normally available to the movable member and which second source of fluid pressure is in the form of a vaporizing fluid of a nature to maintain a constant vapor pressure of a predetermined minimum, condensing the vapor by operating the member by the first source of fluid pressure.

3. The method of controlling the positioning of a hydraulic operator comprising a cylinder having a piston movably positioned therein and dividing the cylinder into first and second compartments, an operating member fixed to the piston and extending outwardly of the cylinder, said method comprising the steps of actuating the operating stem to a first position by communicating a source of fluid pressure into said first compartment, moving the operating stem to a second position upon failure of the source of fluid pressure by communicating a source of vapor pressure to the second compartment normally available to the piston which second source of fluid pressure is in the form of a vaporizing fluid of a nature to maintain a constant vapor pressure of a predetermined minimum, condensing the vapor by moving the operating stem to said first position by the source of fluid pressure.

4. The method of controlling longitudinal movement of an operating stem having a member connected thereto comprising the steps of actuating the member confined in a compartment by a first source of power such as fluid pressure, returning the member operated by fluid pressure to its initial position upon failure of the first fluid pressure by providing a second source of fluid pressure normally available to the movable member and which second source of fluid pressure is in the form of a vaporizing fluid of a nature to maintain a constant vapor pressure of a predetermined minimum, condensing the vapor by operation of the member by the first source of fluid pressure.

5. A fail-safe operating mechanism comprising a hydraulic cylinder, a reciprocable stem extending into said cylinder, a piston within said cylinder dividing the cylinder into two compartments and being attached to said stem, means attached to one of said two compartments for the application of hydraulic pressure to such compartment, a chamber having a liquid therein and being in fluid communication with said other compartment, said liquid having a vapor pressure of a constant nature capable of supplying sufficient energy to cause the piston to move said stem toward the hydraulic pressure side of the cylinder upon dissipation of the hydraulic pressure, and with application of said hydraulic pressure and subsequent movement of the piston, said vapor begins to condense while maintaining constant pressure.

6. A fail-safe self-contained stem operating mechanism comprising a hydraulic cylinder, a reciprocable stem extending into said cylinder, a piston within the cylinder dividing the cylinder into two compartments and being attached to the stem, a container at least partially surrounding said hydraulic cylinder, means attached to one of said two compartments for the application of hydraulic pressure to such compartment for moving said piston to one end of said cylinder, a liquid in the container, a port communicating between the other of said compartments and the container, said liquid having a vapor pressure of a constant nature capable of supplying sufficient energy to cause the piston to move to the hydraulic pressure side of the cylinder upon dissipation of the hydraulic pressure, and with application of said hydraulic pressure and subsequent movement of the piston, said vapor begins to condense while maintaining constant pressure.

7. A fail-safe stem operating mechanism comprising a hydraulic cylinder, a stem extending into said hydraulic cylinder, a piston within the hydraulic cylinder dividing the cylinder into two compartments and being attached to said stem, a container enclosing the hydraulic cylinder, means attached to one of said two compartments of said cylinder for the application of hydraulic pressure to such compartment, a fluorinated hydrocarbon in the container, a port communicating between the other compartment of the cylinder and the container, the fluorinated hydrocarbon having a vapor pressure capable at ambient environmental temperatures of supplying sufficient energy to cause the piston to move to the hydraulic pressure side of the cylinder upon dissipation of the hydraulic pressure.

8. A submergible self-contained fail-safe operating mechanism comprising a closed cylinder, a piston movably disposed within the cylinder and dividing the cylinder into first and second compartments, a stem fixed to the piston and extending through a wall of the cylinder in sealing relation therewith, a connection in the cylinder communicating the first of the compartments with a source of pressurized fluid for movement of the piston and stem to a first position, a second connection in the wall of the cylinder, a source of vapor pressure being in fluid communication with the second of said compartments through the second connection and adapted to move said piston and stem to a second position upon failure of said source of pressurized fluid, a protective housing enclosing said cylinder and defining a closed chamber about the cylinder, said closed chamber being filled with substantially incompressible preservative fluid for preventing crushing of the housing by hydrostatic pressure of the environment in which the operating mechanism is submerged.

9. A self-contained fail-safe operating mechanism comprising a closed cylinder, a piston movably disposed within the cylinder and dividing the cylinder into first and second compartments, a stem fixed to the piston and extending through a wall of the cylinder in sealing relation therewith, a connection in the cylinder communicating the first of the compartments with a controllable source of pressurized fluid for movement of the piston and stem to a first position, a second connection in the wall of the cylinder, a source of vapor pressure of a constant nature being in permanent fluid communication with the second of said compartments through the second connection and adapted to move said piston and stem to a second position upon failure of said source of pressurized fluid, and upon application of said pressurized fluid and movement of the said piston and stem to the first position, said vapor begins to condense while maintaining constant pressure.

10. A self-contained fail-safe operating mechanism comprising a closed cylinder, a piston movably disposed within the cylinder and dividing the cylinder into first and second compartments, a stem fixed to the piston and extending through a wall of the cylinder in sealing relation therewith, a connection in the cylinder communicating the first of the compartments with a controllable source of pressurized fluid for movement of the piston and stem to a first position, a second connection in the wall of the cylinder, a source of vapor pressure of a constant pressure located immediately adjacent said cylinder and being in permanent fluid communication with the second of said compartments through the second connection and adapted to move said piston and stem to a second position upon failure of said source of pressurized fluid, and upon application of said pressurized fluid and movement of the said piston and stem to the first position, said vapor begins to condense while maintaining constant pressure, said source of vapor pressure including fluid controlling disconnectable connection structure allowing removal and replacement of said source of vapor pressure while the piston is at either the first or second position without disturbing the operation of the operating mechanism.

11. A self-contained fail-safe operating mechanism comprising a cylinder having closed ends, a piston disposed for reciprocation within said cylinder and dividing the cylinder into first and second compartments, a stem fixed to the piston and extending in sealing relation through one of said end walls and adapted for imparting reciprocal controlling movement to a device, a source of pressurized fluid, a connection between the source and the first compartment for communicating fluid pressure to the first compartment for imparting movement of the piston and stem to an operating position, a source of vapor pressure of a constant nature, a connection between the source of vapor pressure and the second compartment and adapted to introduce substantially constant vapor pressure into the second compartment which is capable at ambient temperature of imparting movement of the piston and stem to a safe position upon dissipation of pressure in the first compartment, and upon application of said pressurized fluid and movement of the said piston and stem to the first position, said vapor begins to condense while maintaining constant pressure, said source of vapor pressure being located immediately adjacent the cylinder, said mechanism adapted to be submerged in a liquid environment, said source of vapor pressure being of such size relative to the size of the cylinder that it may readily be submerged along with the mechanism without being excessively buoyant in said liquid environment.

12. A self-contained fail-safe operating mechanism comprising a cylinder having closed ends, a piston disposed for reciprocation within said cylinder and dividing the cylinder into first and second compartments, a stem fixed to the piston and extending in sealing relation through one of said end walls and adapted for imparting reciprocal controlling movement to a device, a source of pressurized fluid, a connection between the source and the first compartment for communicating fluid pressure to the first for imparting movement of the piston and stem to an operating position, a container of liquid having a vapor pressure of a constant nature capable at ambient environmental temperatures of imparting movement to the piston upon dissipation of operating pressure within the first compartment, a connection between the source of vapor pressure of the second compartment and adapted to introduce substantially constant vapor pressure from the container into the second compartment, and with application of said pressurized fluid and subsequent movement of the said piston and stem to the operating position said vapor begins to condense while maintaining constant pressure, said container of liquid being supported by the cylinder, said mechanism adapted for submersion in a liquid environment, said container of vapor pressure being of equal or less volume than the volume of said cylinder so that it may readily be submerged in said liquid environment along with the cylinder, thereby eliminating the possibility of excessive buoyancy.

13. A self-contained submergible fail-safe operator comprising a closed cylinder having a piston movably disposed therein and dividing the cylinder into first and second compartments, a stem connected to the piston and extending through a wall of the cylinder, a source of pressurized fluid in communication with the first of said compartments and adapted to selectively impart movement of the piston to a first position, a source of vapor pressure of a constant nature supported by the cylinder and being in fluid communication with the second of said compartments and adapted to move the piston and stem to a second predetermined position upon dissipation of pressure within the first compartment, and upon application of said pressurized fluid and movement of the said piston and stem to the first position, said vapor begins to condense while maintaining constant pressure, said source of vapor pressure having negligible buoyancy when submerged in a liquid environment whereby the operator can be located at considerable depths without being unduly buoyant in said liquid environment, the pressure within the second compartment being constant at any static position of the piston and stem.

References Cited by the Examiner

UNITED STATES PATENTS

| Re. 2,461 | 1/1867 | James | 92—134 |
| 2,193,125 | 3/1940 | Evans | 91—402 |
| 2,674,194 | 4/1954 | Arutunoff | 310—87 X |
| 2,805,854 | 9/1957 | Gaebler | 267—65 X |
| 2,918,085 | 12/1959 | Govan | 251—31 |
| 2,926,934 | 3/1960 | Gill | 285—276 |

FOREIGN PATENTS

| 1,165,733 | 6/1958 | France. |
| 647,347 | 12/1950 | Great Britain. |

SAMUEL LEVINE, *Primary Examiner.*

I. C. COHEN, *Assistant Examiner.*